United States Patent [19]

Hurley et al.

[11] Patent Number: 4,622,946
[45] Date of Patent: Nov. 18, 1986

[54] JET IMPINGEMENT/RADIATION GAS-FIRED COOKING RANGE

[75] Inventors: James R. Hurley, East Weymouth; Joseph R. Birkner, West Peabody; Maurice Nunes, Arlington, all of Mass.

[73] Assignee: Thermo Electron Corporation, Waltham, Mass.

[21] Appl. No.: 734,932

[22] Filed: May 16, 1985

[51] Int. Cl.⁴ ............................................... F24C 3/00
[52] U.S. Cl. ................................ 126/39 E; 126/39 R; 126/39 K; 126/214 D; 431/354
[58] Field of Search ............. 126/39 K, 39 R, 214 D, 126/215, 216, 39 H, 40, 214 C, 39 E, 217, 218, 378, 349; 431/354, 350; 165/164; DIG. 11; 34/160

[56] References Cited

U.S. PATENT DOCUMENTS

| 1,048,716 | 12/1912 | Martindale | 431/354 |
|---|---|---|---|
| 1,222,084 | 4/1917 | Donaldson | 431/354 |
| 1,863,003 | 6/1932 | Bethel | 431/354 |
| 2,632,502 | 3/1953 | Heller et al. | 431/354 |
| 3,169,871 | 2/1965 | Macchi et al. | 126/39 R |
| 4,003,360 | 1/1977 | Branson | 126/39 E |
| 4,108,242 | 8/1978 | Searight et al. | 165/164 |
| 4,373,702 | 2/1983 | Jayaraman et al. | 266/111 |
| 4,467,783 | 8/1984 | Hurley et al. | 126/378 |

Primary Examiner—James C. Yeung
Attorney, Agent, or Firm—Herbert E. Messenger; George W. Crowley

[57] ABSTRACT

A gas-fired cooking range having a powered combustion air and gas input; proportional turndown burner control irrespective of the number of burners being used or the degree of turndown of any burner; light-weight jet impingement/radiation members being provided on each burner for efficient heat transfer to utensils and a simplified ignitor/sensor system for all burners operable by any individual burner control.

12 Claims, 7 Drawing Figures

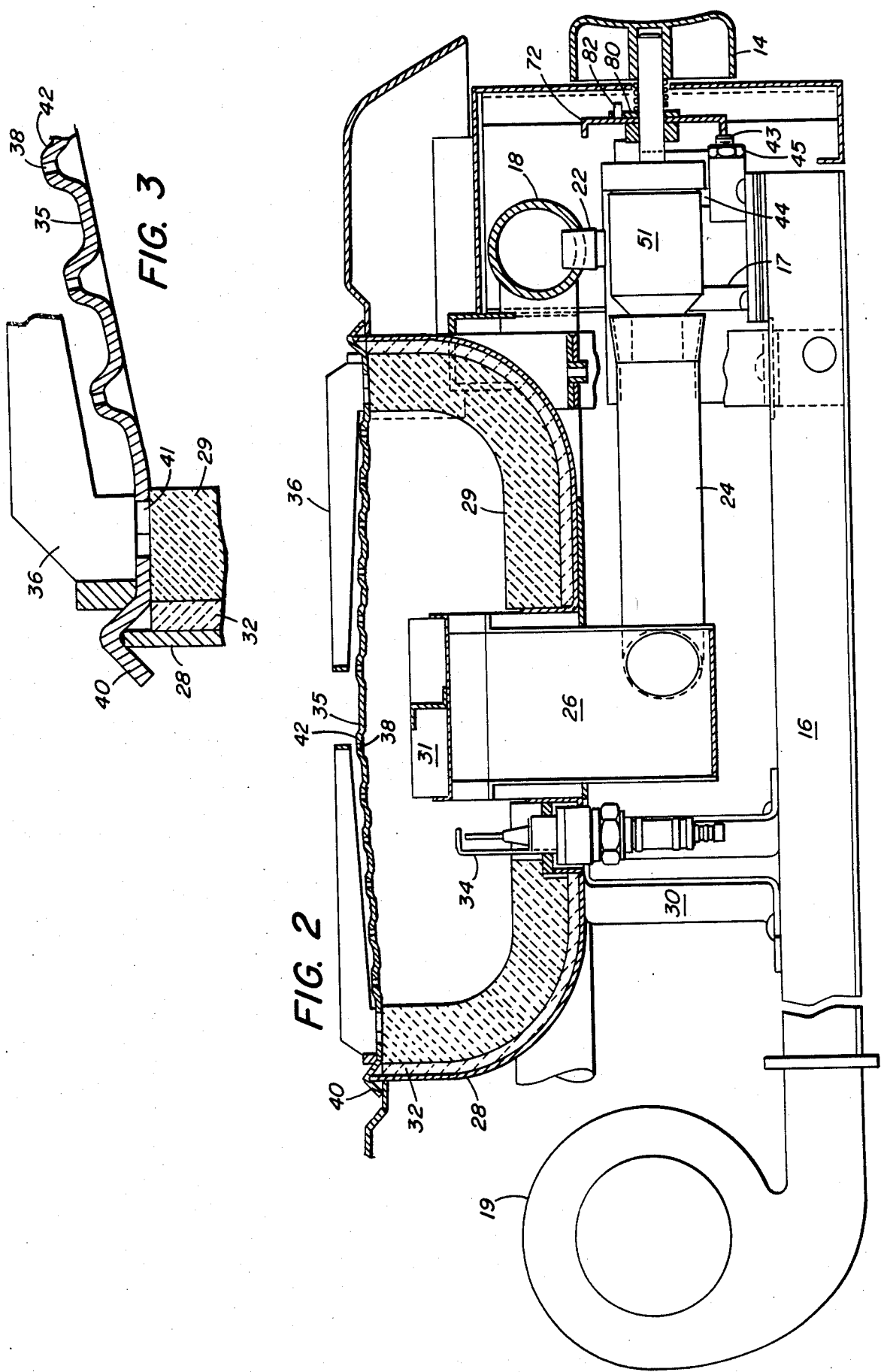

JET IMPINGEMENT/RADIATION GAS-FIRED COOKING RANGE

BACKGROUND OF THE INVENTION

This invention relates in general to cooking ranges and in particular to powered gas-fired cooking ranges.

The range of the present invention is of the high performance type finding its major applications in commercial and institutional cooking. Although the advantages of fuel-saving and reduction of pollutants are also of interest and value in residential cooking equipment, the potential for reduced fuel costs and high efficiency is most attractive in volume cooking operations.

Commercial ranges of the gas-fired type currently in use do not differ significantly from domestic ranges except for their greater size and capacity and more durable construction. Generally, gas is introduced at relatively low standard pressure to be mixed with combustion air at atmospheric pressure. Turndown for each burner is individually controlled after ignition from a constantly burning pilot which serves all burners. Another characteristic which commercial ranges have in common with domestic ranges is very poor efficiency of heat transfer from burner to cooking utensil.

Some efforts have been made to improve efficiency of heat transfer by pressurizing input combustion air, but generally the piping and equipment for such arrangements has been undesirably expensive and awkward to incorporate in a range of acceptable size. Moreover, maintaining desired fuel/air relationships has proven difficult, especially as burners are typically operated over wide ranges of turn-down, in some cases from 1/5 to 1/10 of rated input.

It has also been attempted to design burners in configurations which direct more of the available output heat to the cooking utensil. However, only minimal progress has been made in this direction.

It is, therefore, an object of the present invention to increase efficiency in gas-fired cooking ranges, especially of the commercial and institutional type.

Another object of the invention is to simplify and make practical the use of powered combustion in cooking ranges.

Still another object of the invention is the modification of the design of cooking range burners to improve the transfer of heat to cooking utensils.

A further object of the invention is the provision of an economical and dependable burner ignition and control system.

SUMMARY OF THE INVENTION

The foregoing objects are achieved in the present invention by combining one or more highly efficient burners with an input control system which provides powered combustion air and gas to each burner in proper proportions irrespective of the number of burners being operated or the level of burner operation. Each burner includes a lined combustion chamber as well as a lightweight, shaped jet impingement/radiation (JIR) plate which radiates heat to a cooking utensil and directs jets of combustion gases upon the base of the cooking utensil. The input control system includes a single blower, a plenum chamber serving as a reservoir for pressurized air, and an air-gas control valve for each burner which maintains a proper flow of gas and air to its associated burner irrespective of the number of burners being operated or their level of operation. An ignitor which may also serve as a sensor of operation is disposed at each burner, and after air pressure reaches the proper level for burner operation, all ignitors can be energized simultaneously.

For a better understanding of the present invention, together with its other features and advantages, reference should be made to the description below of a preferred embodiment which is shown in the appended drawing in which:

BRIEF DESCRIPTION OF DRAWING

FIG. 2 is a side view partially in section of a burner and control valve of the range of FIG. 1 which also shows, in schematic form, a blower for the range;

FIG. 3 is a fragmentary side view of a portion of a jet impingement/radiation (JIR) plate illustrating the dimple-like protrusions of the plate and its support arrangement;

DESCRIPTION OF PREFERRED EMBODIMENT

Figure 1:
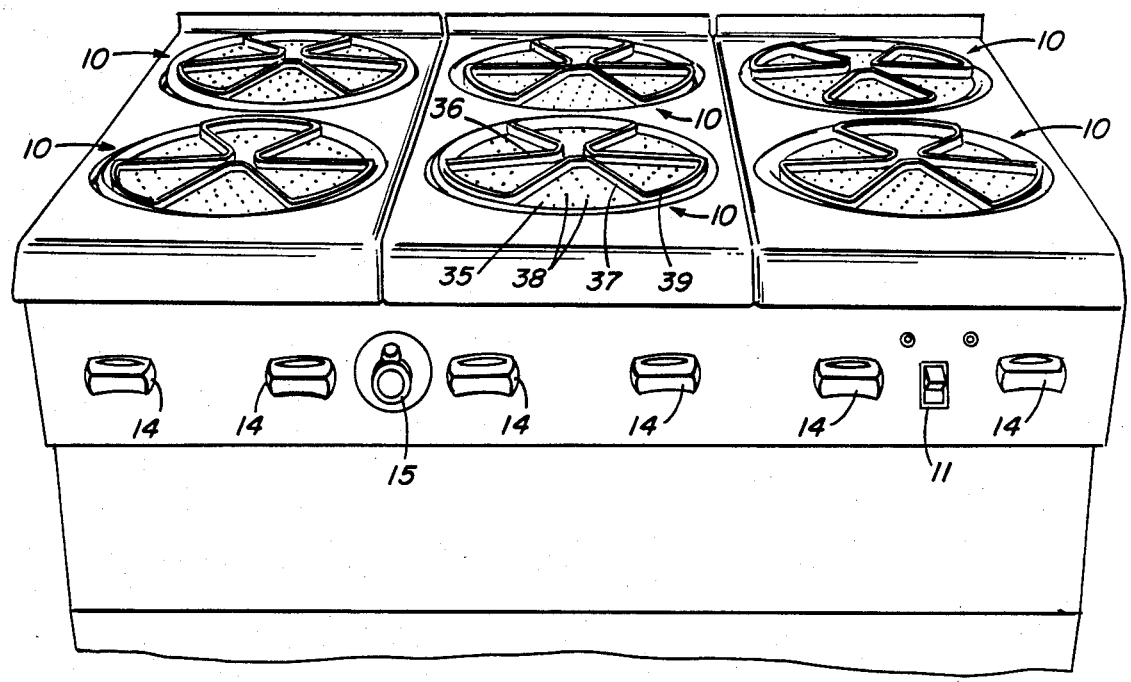
FIG. 1 is a partial perspective view of a commercial range incorporating the present invention.

The cooktop in FIG. 1 is a part of a commercial range which may include one or more burner assemblies 10, six being shown in FIG. 1 by way of illustration, and, in some cases, an oven located below the cooktop. A power switch 11 is provided on the range panel to initiate air pressurization. Individual controls 14 for the burners are arrayed at the top front panel of the range as is an oven control 15. These controls and their operation are described in greater detail below.

FIG. 2 shows details of a typical burner assembly. A blower 19 may be disposed at the back of the range for supplying pressurized air to a plenum or air chamber 16. The plenum 16 is of rectangular cross-section and of relatively large volume extending across substantially the entire length and width of the range. Outlets from the plenum 16, such as that shown at 17, adjustable in size, lead to each burner of the range through valving arrangements described in detail below. At the right of the figure a gas manifold 18 is shown. A gas fitting or inlet tube 22 communicating with the manifold 18 is disposed opposite the air connection in the valving arrangement for each burner. An outlet fuel gas/air tube 24 leads from the valve to the base of a burner such as a ribbon burner 26. The ribbon burner is centrally mounted in a burner bowl 28. The burner bowl 28 may be lined with a refractory liner 29 backed up by fibrous insulation 32 and supported by brackets 30 mounted atop the plenum 16. A disk 31 of similar refractory material is mounted atop the burner 26. Adjacent the burner 26 is an ignitor/sensor 34 which passes through the burner bowl and liner. A lightweight jet impingement/radiation (JIR) plate 35 slightly domed or having the shape of a portion of a sphere, is supported upon the burner liner 29. Above the JIR plate 35 is an open grate 36 on which a cooking utensil (not shown) may be supported. A preferred grate 36, illustrated in FIG. 1, includes a plurality (e.g., three) of pairs of radial spokes 37 spaced so as not to block jet holes 38 in the JIR plate 35 underlying the grate 36, with each pair of spokes 37 being joined by a circumferential rib 39. The grate 36 in turn is supported in part by the JIR plate 35 and may also be supported by a peripheral rim 40 which also acts to seal the gap between the burner bowl 28 and liner 29 containing the fibrous insulation 32.

Figure 4:
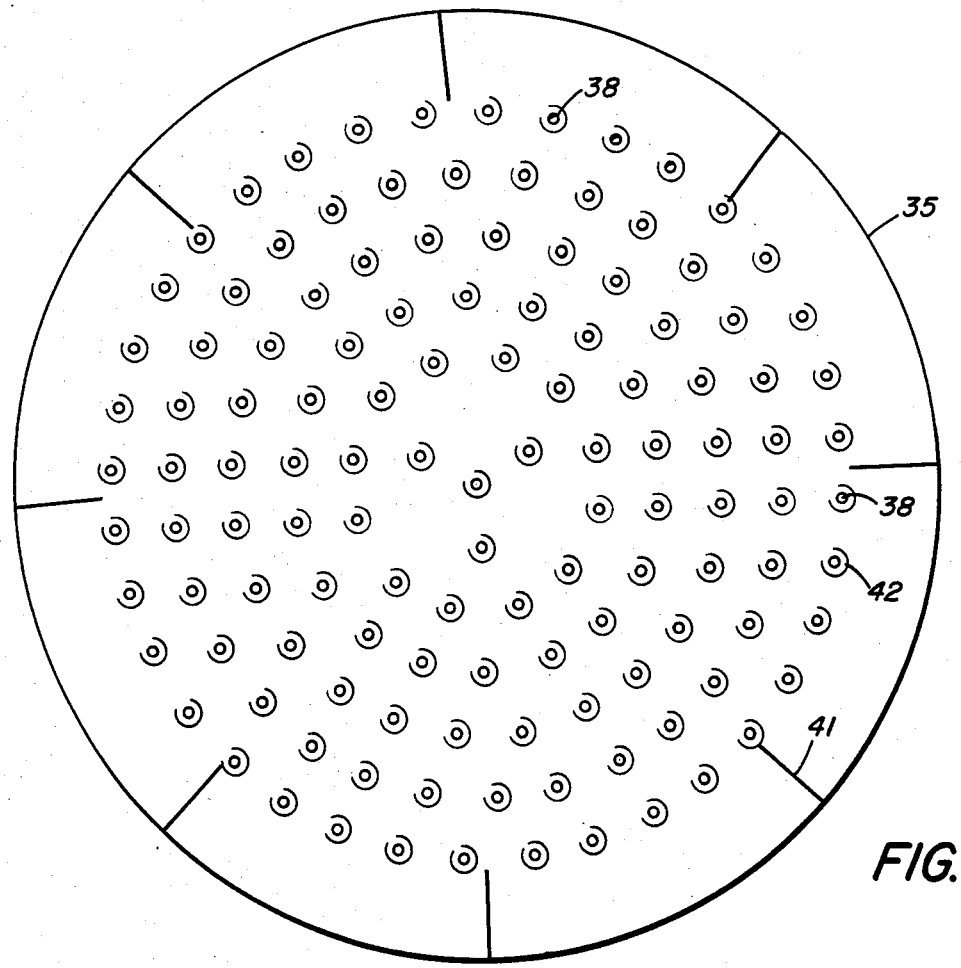
FIG. 4 is a plan view of a preferred JIR plate.

FIGS. 3 and 4 show additional details of a preferred JIR plate 35, which functions to transfer heat from the burner 26 to a cooking utensil both by radiation and by convective jets produced by the jet holes 38 formed in the plate. To provide fast response (heat-up and cool-down) to changes in output of the burner 26, the JIR plate is made of relatively light material such as 16-gage (about 0.062 inches thick) corrosion-resistant, high temperature steel. Moreover, in order that the JIR plate 35 retain its shape and position at high temperatures (e.g., up to about 1500° F.), the plate is domed or formed with a convex upward shape, and several radial slits 41 may also be provided at spaced intervals of the periphery of the plate to relieve high temperature stress.

Each jet hole 38 of the JIR plate 35 is preferably located at the top of a protrusion 42 formed in the plate. These protrusions 42 may be made, for example, by applying a die set or punch to jet holes 38 of appropriate diameter (e.g., 3/32 inch) which have previously been drilled in the plate 35. The protrusions 42 serve several functions. They decrease the effective "target" distance between each jet hole 38 and the bottom surface of a utensil, thus allowing higher convective jet velocities, while at the same time providing ample space between adjacent holes 38 for exhaust flow of spent jets without interference with incoming jets. The protrusions 42 also help stiffen the lightweight plate 35, helping prevent warping or changes in shape due to high temperature operation. Further, the protrusions help deflect spills away from the holes 38.

As previously noted, air from the plenum 16 passes into the valve body through the opening 17. A set screw 43 is threaded through a boss 44 and the wall of the opening 17 to partially block the air passage. Its setting thus determines the volume of air passing through the opening 17. A jam nut 45 may be set to lock the screw 43 in a chosen optimum position.

Figure 5:
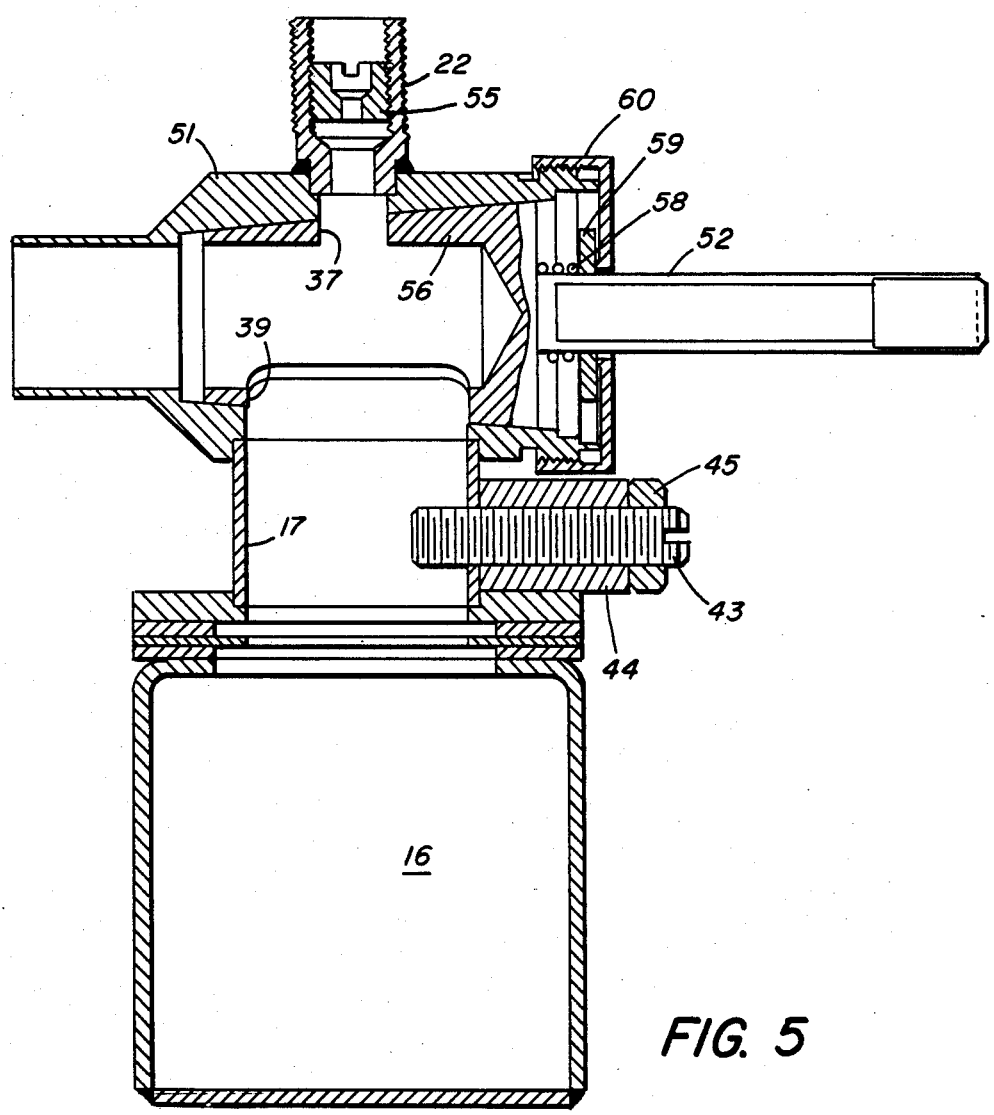
FIG. 5 is an enlarged view of the mixing portion of the valving arrangement of FIG. 2.

In FIG. 5, greater detail on the burner control valving may be seen. The opening 17 is formed in an extension integral with or fitted in a valve body 51. The set screw 43 may be seen to be adjustable in the boss 44 to define the capacity and thereby control the volume of the flow of input air to the valve. The gas tube 22 through which fuel gas is supplied to the valve body 51 may include an internally threaded replaceable gas orifice 55 having a slotted top to facilitate its removal and replacement. A valve plug 56 is rotatable in the valve body 51 by means of a shaft 52 on which the control knob 14 (FIG. 2) is mounted. The valve plug 56 is tapered and held in place in the similarly tapered valve body 51 by the pressure of a spring 58 compressed between the head of the valve plug 56 and a washer 59 held in place by an abutting threaded collar 60.

Figure 6:
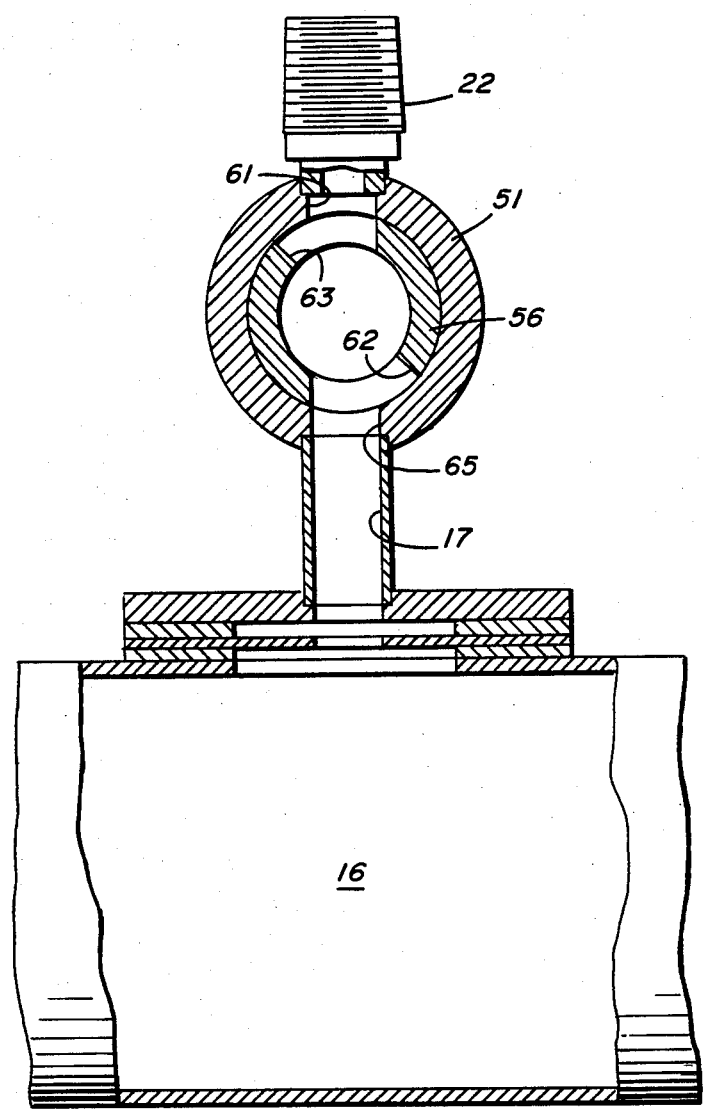
FIG. 6 is a frontal view partially in section of the valve arrangement of FIG. 2.

In FIG. 6, the valve arrangement is shown in a frontal view and partly in section. In the sectional view, the opening 61 for input gas in the valve body 51 may be seen to be of smaller size than the opening 63 in the valve plug 56. Specifically, the opening 63 is of roughly elliptical shape and of greater width than the opening 61 in a plane normal to the axis of the valve body. Similarly, the opening 62 in the valve plug 56 is of greater width than the opening 65 in the valve body. It will be apparent that when the control knob 14 is rotated to turn the valve plug 56, the openings for gas and air are adjusted proportionately and simultaneously in order that proper proportions are maintained during turn-down.

The ignitor 34 shown in FIG. 2 may be a simple spark plug or may be additionally a sensor to detect whether or not the ribbon burner 26 is in operation. The ignitors of all burners are identical and are energized simultaneously when any individual burner is turned on. After the power switch 11 is activated to cause the blower to pressurize the plenum 16 with air, rotation of any control knob 14 in a counterclockwise direction first fully opens the valve to permit inflow of gas and pressurized air. Further turning in a counterclockwise direction then energizes all ignitors. Turn-down of each burner is then achieved by rotation of its respective control knob in the opposite or clockwise direction.

Figure 7:
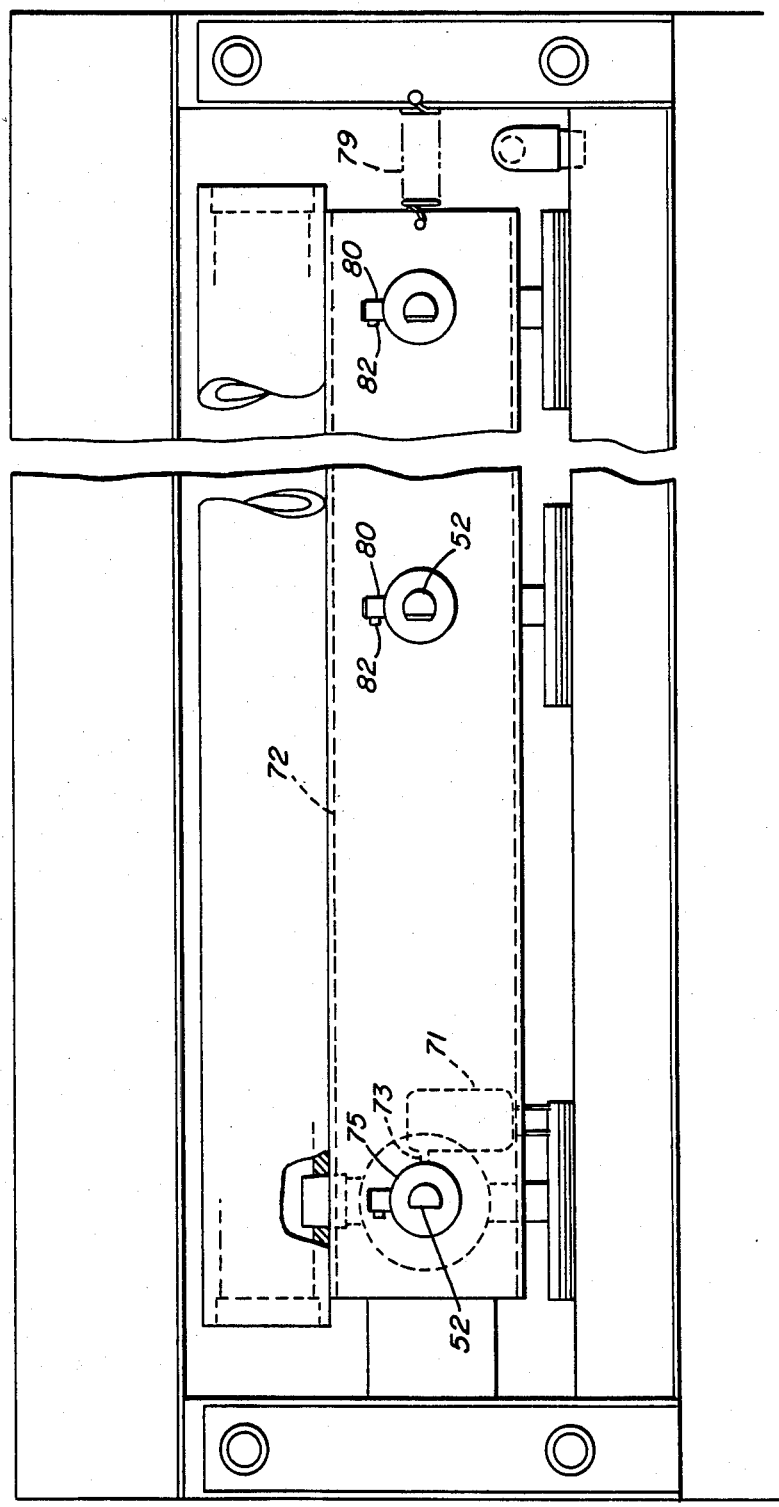
FIG. 7 is a fragmentary view of the upper front portion of the range illustrating the control of ignitors for the burners.

The mechanism for performing these control functions is shown in FIG. 7 and, in part, in FIG. 2. A microswitch 71 is mounted on a slide bar 72 slidable in the frame of the range and has a contact plunger 73 which is normally depressed by pressure exerted against it by a boss 75 extending from the slide bar 72. The slide bar 72 is normally urged to the right as shown by a spring 79 connected between the slide bar and the frame of the range. Counterclockwise rotation of any burner control knob to a point beyond the fully open valve position causes a tongue 80 on the shaft 52 to engage a tab 82 on the slide bar 72. The slide bar 72 moves from right to left as seen in FIG. 7 to permit the plunger 73 to move outwardly and actuate the microswitch 71 and to energize all ignitors.

In operation, the blower is turned on first by activating the power switch 11. The air plenum 16 rapidly reaches a pressure of about 0.2 inch water. A pressure sensor (not shown) connected to the manifold 16 prevents inflow of gas or ignitor actuation until this pressure is reached. A full counterclockwise turn of any control knob to a twelve o'clock position causes a pressurized mixture of fuel gas and air to be fed at a maximum rate to the associated burner. Further counterclockwise rotation of the control knob causes right-to-left movement of the slide bar 72, actuation of the microswitch 71, and energization of all ignitors. The use of a single blower and a large plenum for all burners simplifies the structure and the relatively large plenum capacity assures consistent operation irrespective of the numbers of burners being used. Also, because all ignitors are energized whenever a burner is turned on, only a single circuit is required, reducing cost and complexity. Because the ignitors are in operation for only long enough to ignite the combustion fuel, there is no significant waste of energy.

The ribbon burner 26 and associated JIR plate 35 provide heat by convection and radiation to a cooking utensil (not shown) supported on the grate 36. The burner rapidly heats the lightweight JIR plate 35 to red heat so that the plate 35 directs radiant energy to the cooking utensil. At the same time, hot combustion products pass through the many openings in the JIR plate 35 to impinge upon the bottom of the cooking utensil. These jets disrupt surface boundary layers and, together with the radiant energy from the jet plate 35, greatly increase the efficiency of heat transfer to the cooking utensil. Cooking efficiencies as high as about 72% are obtained.

The use of replaceable gas orifices 55 and the adjustability of the input air opening provided by the set screw 43 allow the range to be quickly and easily adapted to different fuel gases such as propane, butane, natural and high hydrogen gas. The blower and air plenum are properly sized and matched to ensure constant pressure and balanced air flow irrespective of the number of operating burners or their level of operation.

What is claimed is:

1. A gas-fired cooking range comprising at least one burner, a valving device connected to said burner, an air plenum having an air outlet connected to said valving device, means for supplying pressurized air to said air plenum, a fuel gas manifold having a gas outlet connected to said valving device, said valving device being operable to form a pressurized mixture of fuel gas and air, adjusting means connected to each said valving device to control the rate of flow of said mixture to said burner connected to said valving device, means for maintaining predetermined proportions of fuel gas and air in said mixture at all rates of flow of said mixture set by said adjusting means, support means for supporting a cooking utensil above said burner, and a jet plate positioned between said support means and said burner, said jet plate having a domed, convex-upward shape and including a plurality of protrusions extending upwardly towards said support means and having a jet hole in the top of each said protrusion, said burner operable to direct combustion cases towards said jet plate to heat said jet plate to a temperature of up to about 1500° F. and to cause convective jets of gases to formed by said jet holes, said jet plate thereby transferring heat energy to said utensil both by radiation and by impact of said convective jets on the bottom surface of said vessel.

2. A gas-fired cooking range as defined in claim 1 including at least two burners, and further comprising means disposed adjacent each said burner for igniting said mixture and means for simultaneously energizing all of said igniting means.

3. A gas-fired cooking range as defined in claim 2 wherein each said adjusting means includes a rotatable shaft and said means for simultaneously energizing all of said igniting means includes a switch actuatable by a slide bar movable in response to predetermined rotation of any of said shafts.

4. A gas-fired cooking range as defined in claim 2 wherein said burners are symmetrically disposed on the top surface of said range and said air plenum comprises a chamber disposed beneath said burners and extending substantially across the length and width of said range.

5. A gas-fired cooking range as defined in claim 1 wherein said means for maintaining predetermined proportions of fuel gas and air in said mixture includes a valve body, a valve plug rotatable in said valve body and a mixture outlet connected to said burner, said valve body and said valve plug having cooperating openings formed therethrough for the passage of fuel gas and pressurized air, said cooperating openings being of predetermined relative size and shape to maintain proportionality of flow of fuel gas and pressurized air at all positions of said rotatable valve plug in said valve body.

6. A gas-fired cooking range as defined in claim 5 wherein said jet plate is circular in shape and includes a plurality of slits at spaced intervals around, and extending radially inward from, its periphery.

7. A gas-fired cooking range as defined in claim 5 and including a control knob attached to said valve plug, and wherein the openings in said valve plug are larger than the openings in said valve body, said openings in said valve plug being shaped such that rotation of said valve plug by said control knob simultaneously and proportionately adjusts the flow of fuel gas and pressurized air through said valve plug.

8. A gas-fired cooking range comprising a plurality of burners, support means for supporting a cooking utensil above each of said burners, a jet plate positioned between each of said burners and said support means and having a domed, convex upward shape and a plurality of protrusions extending upwardly towards said support means, with a jet hole in the top of each said protrusion, said plate operable, upon being heated to a red heat condition by combustion gases from said burner, to radiate heat to said utensil and to deliver convective heat to said utensil by means of jets of combustion gases passing through said jet holes, an air plenum disposed substantially coextensively with the top of said range beneath said burners, means for supplying air under pressure to said air plenum, a fuel gas manifold, a valve for each of said burners having a body and a hollow plug rotatable in said body, a first inlet to said valve body connected to said air plenum, an outlet from said valve body connected to one of said burners, said hollow plug having a first opening formed through the wall thereof communicating with said first inlet to said valve body for the flow therethrough of fuel gas from said manifold to said burner and a second opening formed through the wall thereof communicating with said second inlet to said valve body for the flow therethrough of air from said plenum to said burner, the size of said first opening being a predetermined proportion of the size of said second opening, and valve control means for simultaneously adjusting the size of said first and second openings while maintaining said predetermined proportion.

9. A gas-fired cooking range as defined in claim 8 including, for each said burner, an upward facing burner bowl having a refractory liner and a central opening through which said burner extends, said jet plate being supported on said liner and including a plurality of upward extending protrusions each having a jet hole formed in the top thereof.

10. A gas-fired cooking range as defined in claim 9 including a grate positioned above said jet plate, said grate comprising a flat, open structure operable to support a cooking utensil without blocking the flow of jets of gases directed at the bottom of said utensil through said jet plate.

11. A gas-fired cooking range as defined in claim 8 further comprising an ignitor adjacent to each burner for igniting a pressurized mixture of air and fuel gas from said valve, and means for simultaneously energizing all of said ignitors upon predetermined rotation of any of said hollow plugs.

12. A gas-fired cooking range as defined in claim 8 wherein each of said jet plates is circular in shape and includes a plurality of slits at spaced intervals around, and extending radially inward from, its periphery.

* * * * *